United States Patent
Attar

(10) Patent No.: US 12,225,168 B2
(45) Date of Patent: Feb. 11, 2025

(54) SYSTEMS AND METHODS FOR MEASURING DOCUMENT LEGIBILITY

(71) Applicant: Capital One Services, LLC, McLean, VA (US)

(72) Inventor: Aaron Attar, Dallas, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 18/593,608

(22) Filed: Mar. 1, 2024

(65) Prior Publication Data
US 2024/0205350 A1    Jun. 20, 2024

Related U.S. Application Data

(63) Continuation of application No. 17/898,497, filed on Aug. 30, 2022, now Pat. No. 11,956,400.

(51) Int. Cl.
  *H04N 1/32* (2006.01)
  *G06V 30/12* (2022.01)
  *G06V 30/416* (2022.01)

(52) U.S. Cl.
  CPC ....... *H04N 1/32625* (2013.01); *G06V 30/133* (2022.01); *G06V 30/416* (2022.01); *G06V 2201/10* (2022.01)

(58) Field of Classification Search
  None
  See application file for complete search history.

(56) References Cited

U.S. PATENT DOCUMENTS

| | | | |
|---|---|---|---|
| 4,817,171 A | 3/1989 | Stentiford | |
| 7,136,511 B2 | 11/2006 | Harrington et al. | |
| 7,466,875 B1 * | 12/2008 | Siegel | G06V 10/993 358/537 |
| 7,495,795 B2 | 2/2009 | Graham et al. | |
| 8,615,124 B2 | 12/2013 | Faulkner et al. | |
| 8,620,083 B2 | 12/2013 | King et al. | |
| 8,635,531 B2 | 1/2014 | Graham et al. | |

(Continued)

FOREIGN PATENT DOCUMENTS

| CN | 108764007 A | 11/2018 |
|---|---|---|
| EP | 1503339 B1 | 6/2012 |

(Continued)

*Primary Examiner* — Andrew H Lam
(74) *Attorney, Agent, or Firm* — TROUTMAN PEPPER LOCKE LLP; Christopher J. Forstner; John A. Morrissett

(57) ABSTRACT

Disclosed embodiments may include a system for measuring document legibility. The system may automatically receive document image data from a user device. The system may then process the image data using optical character recognition to create language data containing a plurality of words. The system may then obtain an overall number by counting the plurality of words in the language data. The system may then identify and count the common words within the plurality of words by comparing the plurality of words to words in a database. A score may be obtained by dividing the common word number by the overall number. The score may then be compared to a legibility threshold. If the score is below the threshold, the system may determine the document is illegible. If the score is above the threshold, the system may determine the document is legible.

20 Claims, 4 Drawing Sheets

(56) References Cited

U.S. PATENT DOCUMENTS

| | | |
|---|---|---|
| 8,897,579 B2 | 11/2014 | Chaudhury et al. |
| 9,361,531 B2 | 6/2016 | Stella |
| 10,068,155 B2 | 9/2018 | Kalyuzhny |
| 11,106,907 B2 | 8/2021 | Bull et al. |
| 11,120,256 B2 | 9/2021 | Prasad et al. |
| 2005/0028099 A1* | 2/2005 | Harrington .......... G06V 10/993 715/244 |
| 2006/0029258 A1 | 2/2006 | Harrington et al. |
| 2018/0011974 A1 | 1/2018 | Schneider et al. |

FOREIGN PATENT DOCUMENTS

| | | |
|---|---|---|
| EP | 1503342 B1 | 6/2012 |
| EP | 1503341 B1 | 7/2012 |
| JP | 2004348591 A | 12/2004 |

* cited by examiner

SYSTEMS AND METHODS FOR MEASURING DOCUMENT LEGIBILITY

CROSS-REFERENCE TO RELATED APPLICATIONS

This application is a continuation of, and claims priority under 35 U.S.C. § 120 to, U.S. patent application Ser. No. 17/898,497, filed Aug. 30, 2022, the entire contents of which are fully incorporated herein by reference.

FIELD

The disclosed technology relates to systems and methods for measuring document legibility. Specifically, this disclosed technology relates to determining if document scans are legible by determining the percentage of common words detected in the scan.

BACKGROUND

Document scanning is an important part of modern office operations. Digitizing documents can be important for organizational purposes. Digital documents are also substantially easier to send to other people. However, many people know the frequent problems that can result from scanning documents. Sometimes the text is blurred beyond recognition, or the scanner creates artifacts in the image that can block text from being read. Even something as simple as a fly getting stuck on the imager can cause major legibility issues. In documents with lots of pages or lots of text, these problems can be especially troublesome as a large number of the pages may easily escape detection during a quick review of the document if only a few select pages (or even parts of a page) contain visual distortions that make the text illegible. In many cases, rescanning the page is the only option to correct the problem. However, if no one notices that the scans are illegible until after the original has been thrown away, there may be no way to recover the lost information. Failing to quickly detect illegible scanner pages leads to a large amount of wasted time and frustration.

Traditional systems and methods for determining if scans are usable typically have focused on looking at page quality. This is inadequate because conventional systems assess page quality without regard to actual legibility. In those systems, the scan of the page can be adequate in terms of focus, brightness, or contrast, but the actual readability of the text is not considered. This means that even after testing the page can look visually fine, but the text may or may not be illegible.

Accordingly, there is a need for improved systems and methods for measuring document legibility. Embodiments of the present disclosure are directed to this and other considerations.

SUMMARY

Disclosed embodiments may include a system for measuring document legibility. The system may include one or more processors, and memory in communication with the one or more processors and storing instructions that, when executed by the one or more processors, are configured to cause the system to measure document legibility. The system may automatically receive document image data of a document from a user device. The system may also generate a first graphical user interface indicating the system is processing. Additionally, the system may transmit the first graphical user interface to the user device for display. Furthermore, the system may process the document image data to create language data comprising a plurality of words. The system may also count the plurality of words in the language data to obtain an overall number. The system may identify common words from the plurality of words. Furthermore, the system may count the common words to obtain a common word number. Additionally, the system may divide the common word number by the overall number to obtain a score. Also, the system may determine whether the score is below a predetermined legibility threshold. In response to determining the score is below the predetermined legibility threshold, the system may generate a second graphical user interface indicating that the document is not legible, and transmit, to the user device, the second graphical user interface for display.

Disclosed embodiments may include a system for measuring document legibility. The system may include one or more processors, and memory in communication with the one or more processors and storing instructions that, when executed by the one or more processors, are configured to cause the system to measure document legibility. The system may automatically receive document image data of a document from a user device. The system may also process the document image data to create first language data comprising a first plurality of words. Additionally, the system may count the first plurality of words in the first language data to obtain a first overall number. The system may also identify common words from the first plurality of words. Furthermore, the system may count the common words to obtain a first common word number. The system may also divide the first common word number by the first overall number to obtain a first score. The system may determine that the first score is above a predetermined legibility threshold. In response to determining the first score is above the predetermined legibility threshold, the system may generate a first graphical user interface indicating that the document is legible and transmit, to the user device, the first graphical user interface for display. In response to determining the first score is below the predetermined legibility threshold, the system may generate a second graphical user interface indicating that the document is not legible and a prompt asking to rescan the document, and transmit, to the user device, the second graphical user interface for display.

Disclosed embodiments may include a system for measuring document legibility. The system may include one or more processors, and memory in communication with the one or more processors and storing instructions that, when executed by the one or more processors, are configured to cause the system to measure document legibility. The system may automatically receive page image data for each page of a plurality of pages of a document from a user device. The system may also process the page image data for each page to create language data comprising a plurality of words. The system may additionally count the plurality of words in the language data to obtain an overall number. Furthermore, the system may identify common words from the plurality of words. The system may count the common words to obtain a common word number. Additionally, the system may divide the common word number by the overall number to obtain a score. The system may also determine whether the score is below a predetermined legibility threshold. In response to determining the score is below the predetermined legibility threshold for an individual page of the plurality of pages, the system may generate a first graphical user interface indicating that the individual page is not legible and shows the page image data of the page, and transmit, to the user device, the first graphical user interface for display.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for measuring document legibility. More particularly, the disclosed technology relates to using optical character recognition to recognize words in a document and compare the recognized words to common words. The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details processing image data and presenting the findings to a user. This, in some examples, may involve processing document image data to dynamically change the graphical user interface in response to the document image data. Using a graphical user interface in this way may allow the system to show the user a section of a page or text that is illegible. This is a clear advantage and improvement over prior technologies that cannot tell if text is legible because they do not access the legibility of the text only the quality of the image. The present disclosure solves this problem by comparing the words that are read from the document and comparing that with a known database of common words. Furthermore, examples of the present disclosure may also improve the speed with which computers can determine in which a document is legible because the system be used with lightweight OCR systems, which use less computing power. Overall, the systems and methods disclosed have significant practical applications in the document processing field because of the noteworthy improvements of determining document legibility by comparing the words in the document to known common words, which is important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
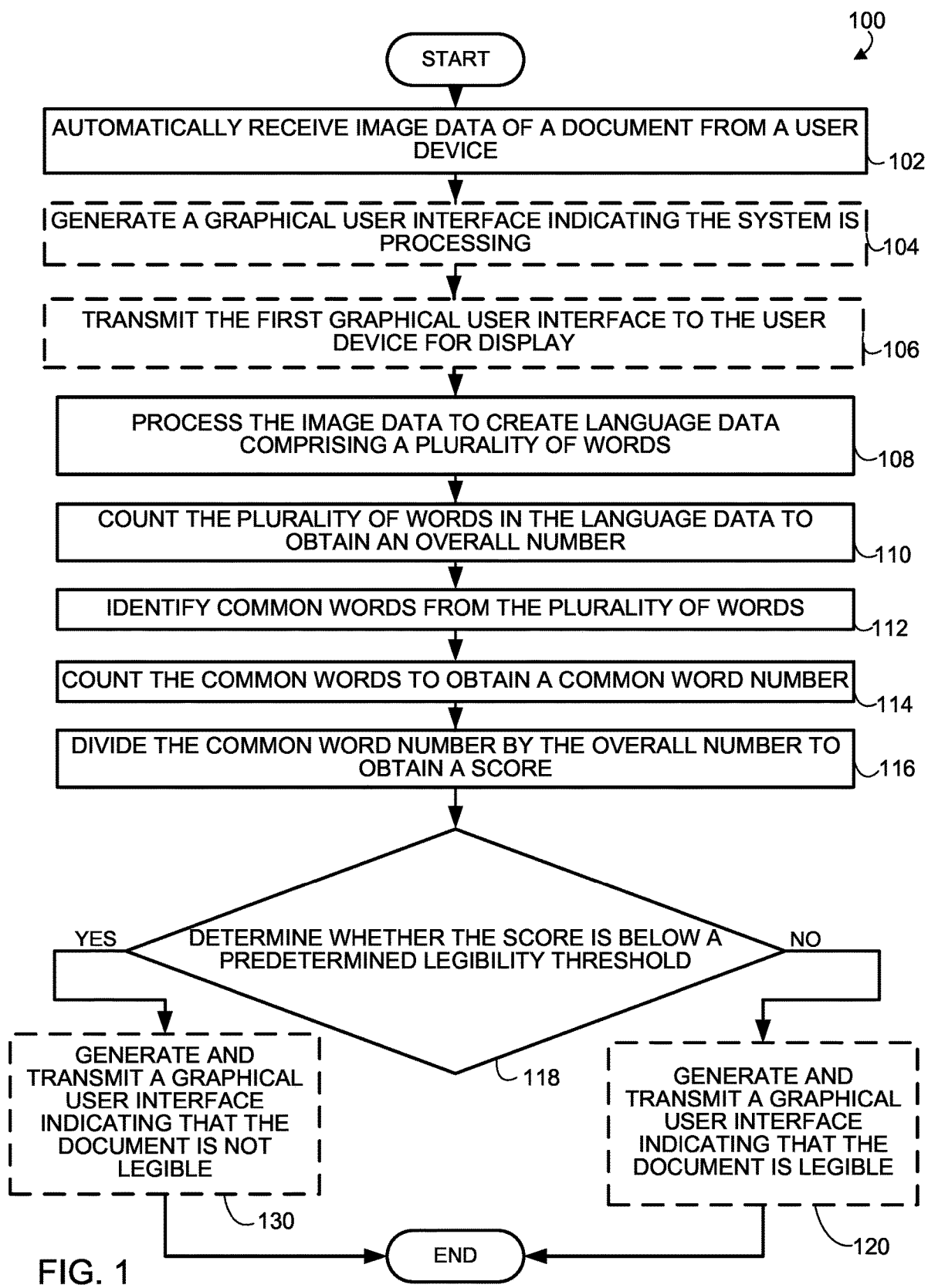
FIG. 1 is a flow diagram illustrating an exemplary method for measuring document legibility in accordance with certain embodiments of the disclosed technology.

FIG. 1 is a flow diagram illustrating an exemplary method 100 for measuring document legibility, in accordance with certain embodiments of the disclosed technology. The steps of method 100 may be performed by one or more components of the system 300 (e.g., legibility measuring system 220 or web server 310 of document system 308 or user device 302), as described in more detail with respect to FIGS. 2 and 3. Steps 108 to 116 may be completed using a custom algorithm.

In block 102, the legibility measuring system 220 may automatically receive image data of a document from a user device. The document image data may be scans of a document. The document may be a document of a single page or a plurality of pages. The document image data may include scans of several documents together. The document image data may be an application or a loan application. The loan application may be for a motor vehicle, recreational vehicle, home, or a number of other utilities. The legibility measuring system 220 may receive the document image data from the user device through a web-based upload portal. The user may not have to select submit for legibility measuring system 220 to receive the documents.

In optional block 104, the legibility measuring system 220 may generate a graphical user interface indicating that the system is processing. This may include a graphic or animation showing the document image data as it is being processed and may be specific to individual page image data. The graphical user interface may display a message that tells the user that the system is processing (e.g., "processing page 10/34"). The graphical user interface may give live feedback from legibility measuring system 220 stating if pages are legible as the processing occurs (e.g., "15/34 pages processed, 11 legible, 4 illegible"). The graphical user interface may present an option for the user to stop processing if one or more pages have been determined by legibility measuring system 220 to be illegible.

In optional block 106, the legibility measuring system 220 may transmit the graphical user interface to the user device for display. The graphical user interface may work with both touchscreen devices (e.g., a smart phone) and non-touchscreen devices using a pointer (e.g., a computer with a mouse). The user device may or may not be a mobile device. The graphical user interface may require a specific application to be installed on the user device to display. Alternatively, the graphical user interface may be displayed on a webpage using a browser.

In block 108, the legibility measuring system 220 may process the document image data. Processing the document image data may involve using optical character recognition software. Optical character recognition is a technology that allows scans of print documents to be converted and interpreted as machine text. The optical character recognition may involve machine learning models or algorithms. After processing the document image data, the legibility measuring system 220 may create language data from the document image data. The language data may consist of letters, numbers, spaces, and may generally correspond to American Standard Code for Information Interchange (ASCII) characters. The language data, if characters, may be sorted into words, phrases, or blocks of text. Legibility measuring system 220 may also store other data, such as position data, that is associated with the language data.

In block 110, the legibility measuring system 220 may count the words in the language data to obtain an overall number. The overall number may represent the total number of words that can be found in the document using optical character recognition. Counting the words in the document may have some restrictions. Specifically, only words above a certain number of characters may be counted in the overall number (e.g., only words having more than 4 characters are counted toward the overall number). Additionally, only words below a certain number of characters may be counted in the overall number. This may intentionally exclude some words that may skew results. Counting the words may occur on a per-page level (e.g., every page has its own overall number). Additional restrictions on words that are counted toward the overall number may apply. For example, certain numbers, such as amounts (e.g., $22.44), names, or abbreviations may be excluded.

In block 112, the legibility measuring system 220 may identify common words from the plurality of words. In this step, the legibility measuring system 220 may compare each of the words in the document to a list of common words. Common words may include words that are found in a dictionary database. The dictionary database may be specific to certain document types and contain words frequently common to those types of documents. The dictionary database may be database 260, database 316, or an external database. The legibility measuring system 220 may attempt to detect the type of document and apply a certain dictionary database that is specific to that document (e.g., a loan document may be examined with a financial dictionary database that has words specific to loans like "curtailment"). The dictionary database may also include abbreviations specific to that document. The dictionary database may include words from one or more languages.

The dictionary database may also be custom to the document. As such, the dictionary database may add information to the list of words in the database that are specific to the document. This list with additional words may be an augmented list. The legibility measuring system 220 may specifically search for certain words meeting certain criteria to add to the dictionary database. For example, if the documents are a car loan application, certain names or proper nouns, such as the name of the bank or the applicant or a geographical location, may be added to the dictionary database. Other words that may be added to the list may be a first name, a last name, an identification number, an institution name, a merchant name, or other similar information. This may prevent words, such as names, that are properly recognized, but would not be typically in a dictionary from adversely affecting the process. The words may be added to the dictionary database for a specific page based on information from other pages in the document (e.g., if page 1 lists the applicant's name, then the applicant's name may be added to the dictionary database for page 2).

The common words in the document may be given a label or flag to indicate they are common and have been matched with a word in the dictionary database. Words that are considered common may also have meet the requirements to be counted in the overall number in block 110 (e.g., if there was a limitation that words under 5 characters were not counted in the overall number, then no words under 5 characters would be compared to the dictionary database or considered 'common').

In block 114, the legibility measuring system 220 may count the common words to obtain a common word number. This may involve counting the words in the document that have been flagged as 'common' in block 112. This step may happen contemporaneously with block 112 (e.g., as the system compares the words in the document to the dictionary database, if a match is found, the common word number advances by one, and if a match is not found the common word number does not advance). To be counted, the words may also have to meet the requirements applied to be counted in the overall number in block 110 (e.g., if there was a limitation that words under 5 characters were not counted in the overall number, then no words under 5 characters would be considered 'common'). Counting the words may occur on a per-page level (e.g., every page has its own common word number).

In block 116, the legibility measuring system 220 may divide the common word number by the overall number to get a score. The score may be between 0 and 1. The score may be presented as a percentage between 0 and 100 percent and may be calculated on a per-page level. The score may be created in other ways and reflect other factors, such as an adjustment for documents of a certain type (e.g., scientific documents may have an adjustment factor to compensate for more difficult-to-interpret language). The score may be tailored to optimal values for reading the characters with a certain optical character recognition system.

In block 118, the legibility measuring system 220 may determine whether the score is below a legibility threshold. The legibility threshold may be a static value that is preset or predetermined (e.g., a score over 70% is considered legible). Alternatively, the legibility threshold may be specific to a certain type of document (e.g., a score over 80% is considered legible for spreadsheets, but a score over 70% is considered legible for bullet-point documents or paragraph documents). The legibility threshold may be variable and may actively change depending on feedback from the user or other documents. The feedback may be used to improve the algorithm, adjustment factor, or legibility threshold. If the score is below the legibility threshold, then the legibility measuring system 220 may direct the page of the document down the path towards block 130. If the score is above the legibility threshold, then the legibility measuring system 220 may direct the page of the document down the path towards block 130. If any pages of a document of multiple pages is determined to be 'not legible' (e.g., the per-page level of page 3 is below 70%, but the rest of the pages are above 70%) then the legibility measuring system 220 may direct the entire document to block 130. The legibility measuring system 220 may add a label or flag to each page in a document to identify if that page is 'legible' or 'not legible'. The legibility measuring system 220 may also add a different label or flat to entire documents of 'legible' if all the pages meet the legibility threshold or 'illegible' if one or more pages are below the legibility threshold.

The legibility measuring system 220 may have multiple thresholds and each page of the document, if it is not above the primary threshold, may be subjected to a secondary threshold (e.g., the primary threshold is 80% and the secondary threshold is 70%). If a page meets a secondary threshold, but does not meet a primary threshold, the legibility measuring system 220 may indicate that the user may want to check the following pages as they may be hard to read but are not illegible.

In optional block 120, the legibility measuring system 220 may generate and transmit a graphical user interface to the user device indicating that the document is legible. The graphical user interface may present a message to the user indicating that the document is legible. The message may indicate that the document is ready for submission (if uploaded to an application or web portal) since all pages are legible. The user may be able to review the image date of different pages of the document using the graphical user interface. If some pages are below the primary threshold, but above the secondary threshold, the pages may be specifically noted on the graphical user interface by a symbol or highlighting. The user may be able to submit the document using the graphical user interface. In response to receiving a signal that the user would like to submit the document, document system 308 may submit the document to a third party. If all pages are 'legible,' as determined by legibility measuring system 220, the document system 308 may submit the document automatically.

In optional block 130, the legibility measuring system 220 may generate and transmit a graphical user interface to the user device indicating that the document is not legible. The graphical user interface may be similar to that presented in FIG. 4. The graphical user interface may present the image data of the pages that the legibility measuring system 220 has found to be 'not legible.' The user may be given the option to scroll through the 'not legible' pages. The legibility measuring system 220 may present or highlight certain words or areas on the page that are not legible by combining the language data with position data regarding the words. This may enable the user to see the exact problem areas on the page. The graphical user interface may also present reasons why the score of the page is below the legibility threshold, which may be taken from a predetermined list of reasons with criteria. The user may have an option to rescan the 'not legible' pages and add the newly scanned pages to the document. The user may also have the option to 'send anyway,' which allows the user to submit the documents (if uploaded to an application or web portal) even though the document may contain 'not legible' pages. This may allow the user to bypass the system. Optional blocks 120 and 130 may be presented as a combined graphical user interface that presents both pages that are 'not legible' and 'legible.'

If the user rescans or adds additional pages to the document, the system may receive and process the second document image data using the same method as the first image data. This process may repeat until the user chooses to submit the documents using the graphical user interface.

The legibility measuring system 220 may also be able to recognize that pages are missing from the document. This may be recognized by looking at page numbers, or other data. This may include data analyzed from other documents that are frequently uploaded by other users. In response to recognizing that pages are missing from the document, the legibility measuring system may generate and transmit an alert that is presented to the user on a graphical user interface via a user device. The graphical user interface may indicate which page or pages are missing.

Figure 2:
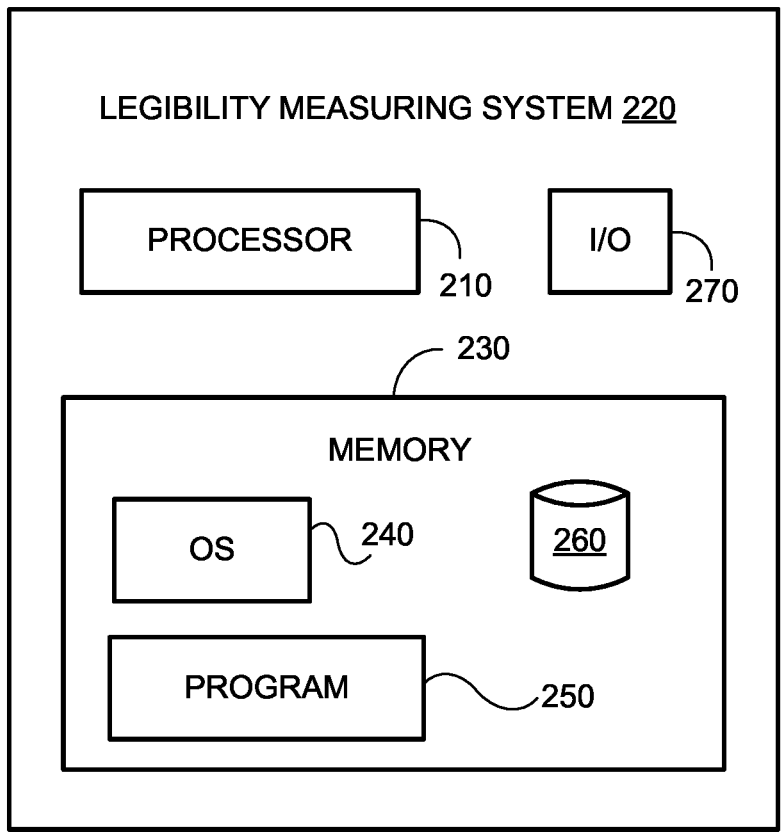
FIG. 2 is block diagram of an example legibility measuring system, according to an example implementation of the disclosed technology.
Figure 3:
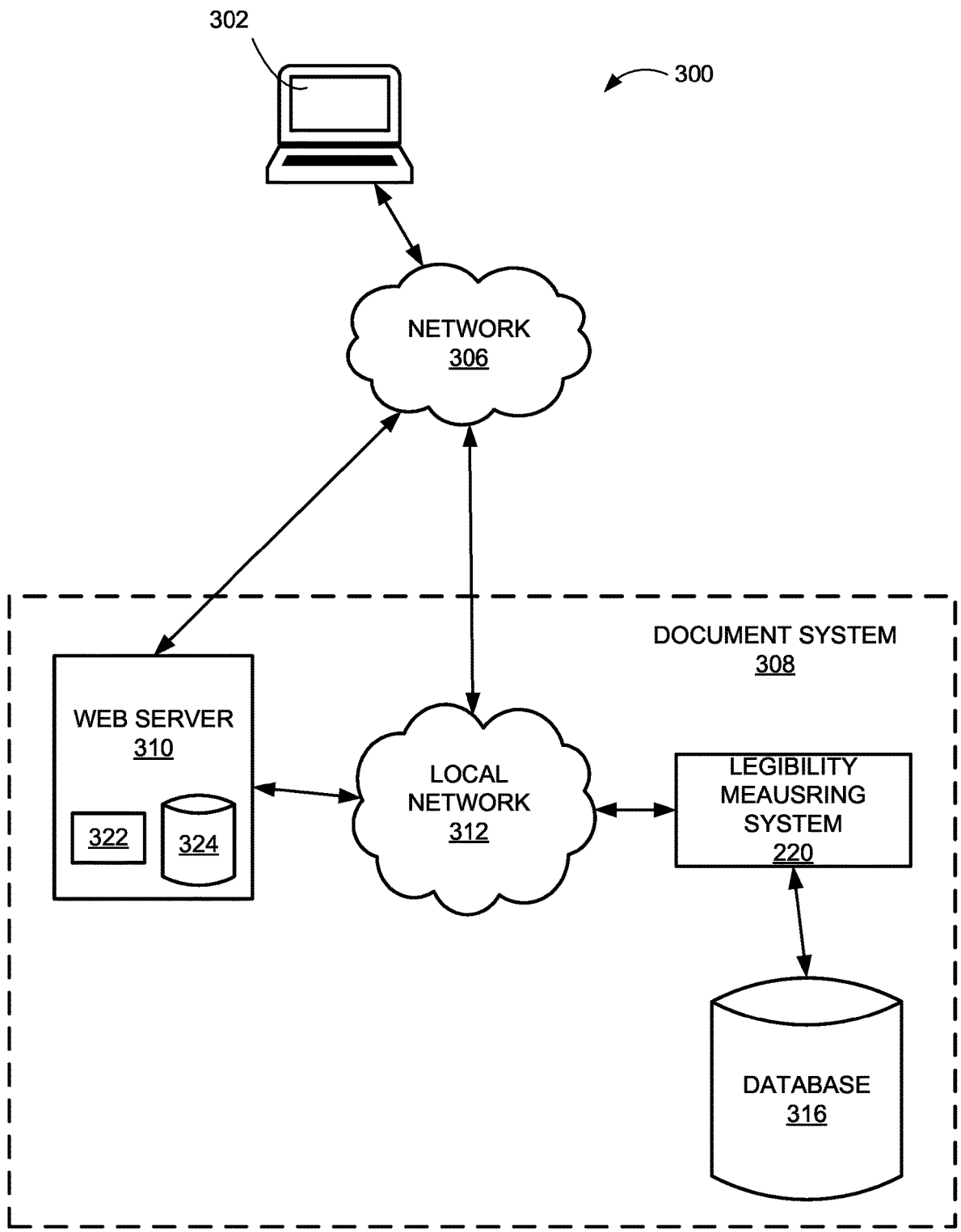
FIG. 3 is block diagram of an example system that may be used to measure document legibility, according to an example implementation of the disclosed technology.

FIG. 2 is a block diagram of an example legibility measuring system 220 used to determine document legibility according to an example implementation of the disclosed technology. According to some embodiments, the user device 302 and web server 310, as depicted in FIG. 3 and described below, may have a similar structure and components that are similar to those described with respect to legibility measuring system 220 shown in FIG. 2. As shown, the legibility measuring system 220 may include a processor 210, an input/output (I/O) device 270, a memory 230 containing an operating system (OS) 240 and a program 250. In certain example implementations, the legibility measuring system 220 may be a single server or may be configured as a distributed computer system including multiple servers or computers that interoperate to perform one or more of the processes and functionalities associated with the disclosed embodiments. In some embodiments legibility measuring system 220 may be one or more servers from a serverless or scaling server system. In some embodiments, the legibility measuring system 220 may further include a peripheral interface, a transceiver, a mobile network interface in communication with the processor 210, a bus configured to facilitate communication between the various components of the legibility measuring system 220, and a power source configured to power one or more components of the legibility measuring system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the legibility measuring system 220 may include one or more storage devices configured to store information used by the processor 210 (or other components) to perform certain functions related to the disclosed embodiments. In one example, the legibility measuring system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The legibility measuring system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the legibility measuring system 220 may include the memory 230 that may include one or more programs 250 to perform one or more functions of the disclosed embodiments. For example, in some embodiments, the legibility measuring system 220 may additionally manage dialogue and/or other interactions with the customer via a program 250.

The processor 210 may execute one or more programs 250 located remotely from the legibility measuring system 220. For example, the legibility measuring system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a legibility measuring system database 260 for storing related data to enable the legibility measuring system 220 to perform one or more of the processes and functionalities associated with the disclosed embodiments.

The legibility measuring system database 260 may include stored data relating to status data (e.g., average session duration data, location data, idle time between sessions, and/or average idle time between sessions) and historical status data. According to some embodiments, the functions provided by the legibility measuring system database 260 may also be provided by a database that is external to the legibility measuring system 220, such as the database 316 as shown in FIG. 3.

The legibility measuring system 220 may also be communicatively connected to one or more memory devices (e.g., databases) locally or through a network. The remote memory devices may be configured to store information and may be accessed and/or managed by the legibility measuring system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The legibility measuring system 220 may also include one or more I/O devices 270 that may comprise one or more interfaces for receiving signals or input from devices and providing signals or output to one or more devices that allow data to be received and/or transmitted by the legibility measuring system 220. For example, the legibility measuring system 220 may include interface components, which may provide interfaces to one or more input devices, such as one or more keyboards, mouse devices, touch screens, track pads, trackballs, scroll wheels, digital cameras, microphones, sensors, and the like, that enable the legibility measuring system 220 to receive data from a user (such as, for example, via the user device 302).

In examples of the disclosed technology, the legibility measuring system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Furthermore, the legibility measuring system 220 may include programs configured to retrieve, store, and/or analyze properties of data models and datasets. For example, legibility measuring system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The legibility measuring system 220 may include algorithms to determine a data type, key-value pairs, row-column data structure, statistical distributions of information such as keys or values, or other property of a data schema may be configured to return a statistical profile of a dataset (e.g., using a data-profiling model). The legibility measuring system 220 may be configured to implement univariate and multivariate statistical methods. The legibility measuring system 220 may include a regression model, a Bayesian model, a statistical model, a linear discriminant analysis model, or other classification model configured to determine one or more descriptive metrics of a dataset. For example, legibility measuring system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The legibility measuring system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, legibility measuring system 220 may be configured to generate a similarity metric representing a measure of similarity between data in a dataset. A similarity metric may be based on a correlation, covariance matrix, a variance, a frequency of overlapping values, or other measure of statistical similarity.

The legibility measuring system 220 may be configured to generate a similarity metric based on data model output, including data model output representing a property of the data model. For example, legibility measuring system 220 may be configured to generate a similarity metric based on activation function values, embedding layer structure and/or outputs, convolution results, entropy, loss functions, model training data, or other data model output). For example, a synthetic data model may produce first data model output based on a first dataset and produce second data model output based on a second dataset, and a similarity metric may be based on a measure of similarity between the first data model output and the second data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The legibility measuring system 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The legibility measuring system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, legibility measuring system 220 is configured to generate and/or train a classification model to classify a dataset, consistent with disclosed embodiments.

While the legibility measuring system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the legibility measuring system 220 may include a greater or lesser number of components than those illustrated.

FIG. 3 is a block diagram of an example system that may be used to view and interact with document system 308, according to an example implementation of the disclosed technology.

The components and arrangements shown in FIG. 3 are not intended to limit the disclosed embodiments as the components used to implement the disclosed processes and features may vary. As shown, document system 308 may interact with a user device 302 via a network 306. In certain example implementations, the document system 308 may include a local network 312, a legibility measuring system 220, a web server 310, and a database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the document system 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the document system 308. Users may also include car dealerships who are seeking to submit loan paperwork on behalf of their customers. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The document system 308 may be associated with and optionally controlled by one or more entities such as a business, corporation, individual, partnership, or any other entity that provides one or more of goods, services, and consultations to individuals such as customers. In some embodiments, the document system 308 may be controlled by a third party on behalf of another business, corporation, individual, partnership. The document system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the legibility measuring system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the document system 308 to interact with one another and to connect to the network 306 for interacting with components in the system 300 environment. In some embodiments, the local network 312 may include an interface for communicating with or linking to the network 306. In other embodiments, certain components of the document system 308 may communicate via the network 306, without a separate local network 306.

The document system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access document system 308 using the cloud computing environment. User device 302 may be able to access document system 308 using specialized software. The cloud computing environment may eliminate the need to install specialized software on user device 302.

In accordance with certain example implementations of the disclosed technology, the document system 308 may include one or more computer systems configured to compile data from a plurality of sources the legibility measuring system 220, web server 310, and/or the database 316. The legibility measuring system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Figure 4:
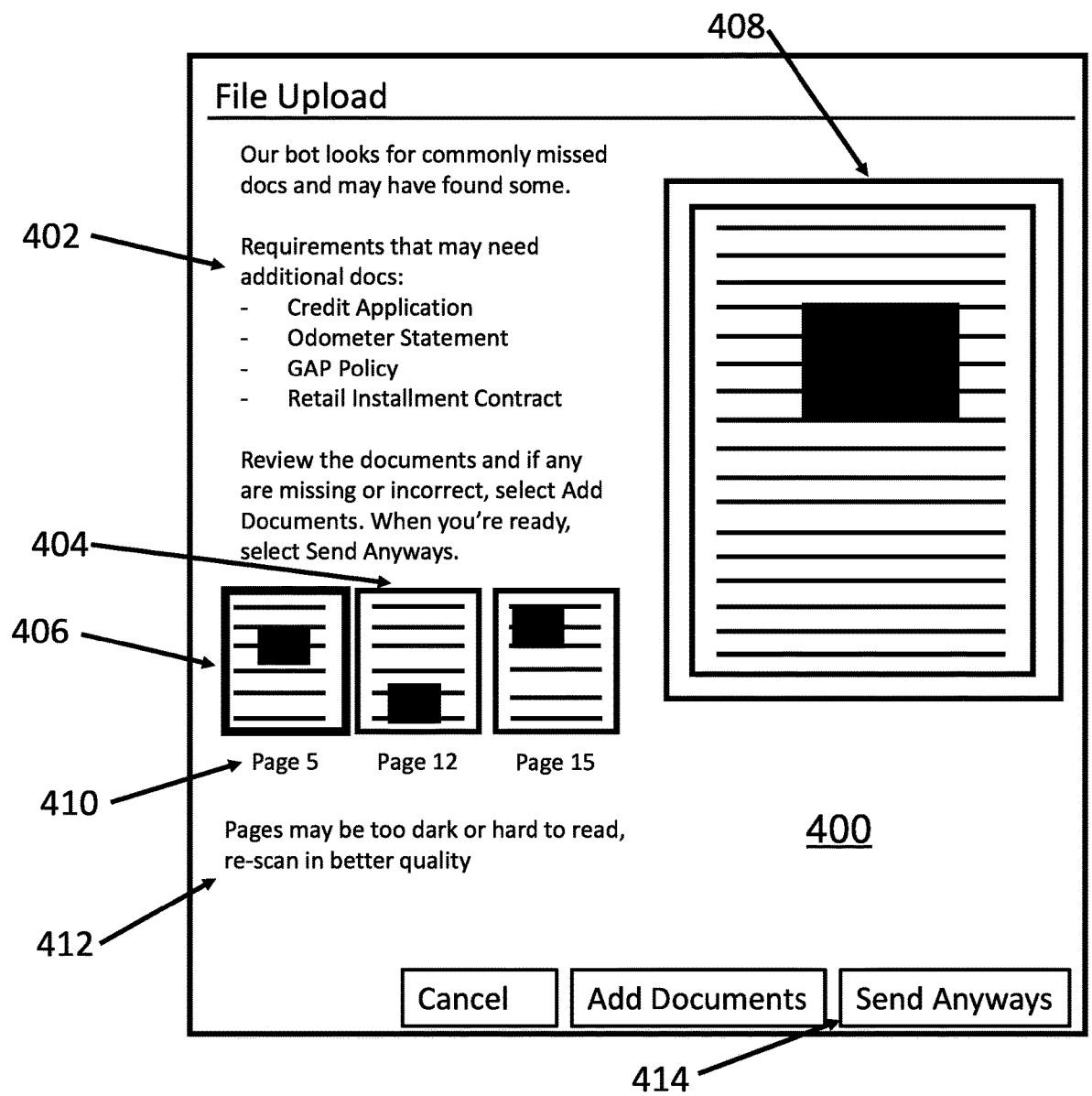
FIG. 4 is an example graphical user interface of an example system that may be used to measure document legibility.

FIG. 4 is an example graphical user interface transmitted to the user for use with legibility measuring system 220 and document system 308. FIG. 4 shows graphical user interface 400. The graphical user interface 400 may contain recommendations about missing documents 402 that it may receive from legibility measuring system 220. Graphical user interface 400 also may contain page preview 404 showing previews of several pages indicated by legibility measuring system 220 to have defects or unreadable text (shown as black boxes). The number of the page 410 in the page preview 404 may be indicated below the page. Page preview 404 may have the ability to scroll to the left or right to see more pages. The page selected 406 may be highlighted (shown as surrounded by a black box) and also shown in large viewer 408. The user may be able to select a different page to view in the large viewer by clicking on that page in the page preview. The graphical user interface 400 may also contain recommendations for rescanning or reasons why the scan is not legible in recommendation text 412. The graphical user interface 400 may also contain buttons 414. The buttons may include a "cancel," which causes the system to end all operations and return to a home screen, an "add documents" that causes the system to allow more scans to be uploaded and reprocessed according to method 100, and a "send anyways" which allows the user to bypass the recommendations of the system and send with potentially illegible documents. The "send anyways" button may allow the user to submit the documents to document system 308.

Example Use Case

The following example use case describes an example of a typical user flow pattern. This section is intended solely for explanatory purposes and not in limitation.

In one example, Scott is trying to buy a car from a car dealer, John. Scott gives John all the necessary paperwork to send off to obtain a car loan. John stacks all the papers together for the loan and scans them to his computer as a single file of multiple pages. John then opens up a web application on the web browser of his computer to access the loan provider's system. John uploads the scan to the web application. The legibility measuring system 220 automatically receives the document image data for each page and processes the pages using optical character recognition. The optical character recognition creates language data for the pages with words. The words on each page with more than four characters are counted. Specifically, of the 36 pages, page 1 specifically has 400 words and page 2 has 200 words. Since the document is a loan application, which the legibility measuring system 220 determines by reading the titles on several pages, a financial dictionary database is used to identify common words in the plurality of words. John's name, account number, and the name of the bank, Capital-One, are added to the financial dictionary database. The legibility measuring system 220 then counts the number of common words with more than four characters that can be identified in the plurality of words on each page. The legibility measuring system 220 determines that page has 350 common words and page 2 has 100 common words. The legibility measuring system 220 then divides the common word number by the overall number to give page 1 a score of 0.875 and page 2 a score of 0.5. Since the legibility threshold is set for financial documents at 0.8, page 1 is above the legibility threshold, and page 2 is below the legibility threshold. The legibility measuring system 220 generates and transmits a graphical user interface to John's computer that displays the image data for page 2 and tells John that the page may be illegible. John zooms in on features of page 2 presented in the viewing window and then rescans and uploads a new copy of page 2. The system then rechecks the new copy according to method 100 and verifies that the new legibility score of page 2 is 0.82. The legibility measuring system 220 then submits the loan application to the bank.

In some examples, disclosed systems or methods may involve one or more of the following clauses:

Clause 1: A legibility measuring system comprising: one or more processors; memory in communication with the one or more processors and storing instructions that are configured to cause the system to: automatically receive document image data of a document from a user device; generate a first graphical user interface indicating the system is processing; transmit the first graphical user interface to the user device for display; process the document image data to create language data comprising a plurality of words; count the plurality of words in the language data to obtain an overall number; identify common words from the plurality of words; count the common words to obtain a common word number; divide the common word number by the overall number to obtain a score; determine whether the score is below a predetermined legibility threshold; responsive to determining the score is below the predetermined legibility threshold: generate a second graphical user interface indicating that the document is not legible; and transmit, to the user device, the second graphical user interface for display.

Clause 2: The legibility measuring system of clause 1, wherein the memory stores further instructions that are configured to cause the system to: retrieve a list of common words from a database.

Clause 3: The legibility measuring system of clause 2, wherein identifying the common words from the plurality of words further comprises: compare each word of the plurality of words in the language data to the list of common words.

Clause 4: The legibility measuring system of clause 2, wherein the memory stores further instructions that are configured to cause the system to: receive document information regarding the document; select certain document information; and add the certain document information to the list of common words to create an augmented list.

Clause 5: The legibility measuring system of clause 4, wherein determining which words in the language data are the common words further comprises: comparing each word in the language data to the augmented list.

Clause 6: The legibility measuring system of clause 4, wherein the predetermined legibility threshold is based on the certain document information.

Clause 7: The legibility measuring system of clause 4, wherein the certain document information is a first name, a last name, an identification number, an institution name, a merchant name or combinations thereof.

Clause 8: The legibility measuring system of clause 1, wherein counting the words in the language data further comprises counting words than have greater than a predetermined number of characters.

Clause 9: The legibility measuring system of clause 1, wherein the memory stores further instructions that are configured to cause the system to: responsive to determining the score is above the predetermined legibility threshold: generate a third graphical user interface indicating that the document is legible for display; and transmit, to the user device, the third graphical user interface.

Clause 10: The legibility measuring system of clause 1, wherein generating the second graphical user interface indicating that the document is not legible includes the document image data.

Clause 11: The legibility measuring system of clause 10, wherein the second graphical user interface that includes the document image data shows a particular part of the document image data that is not legible.

Clause 12: A legibility measuring submission system comprising: one or more processors; memory in communication with the one or more processors and storing instructions that are configured to cause the system to: automatically receive document image data of a document from a user device; process the document image data to create first language data comprising a first plurality of words; count the first plurality of words in the first language data to obtain a first overall number; identify common words from the first plurality of words; count the common words to obtain a first common word number; divide the first common word number by the first overall number to obtain a first score; determine that the first score is above a predetermined legibility threshold; responsive to determining the first score is above the predetermined legibility threshold: generate a first graphical user interface indicating that the document is legible; transmit, to the user device, the first graphical user interface for display; responsive to determining the first score is below the predetermined legibility threshold: generate a second graphical user interface indicating that the document is not legible and a prompt asking to rescan the document; and transmit, to the user device, the second graphical user interface for display.

Clause 13: The legibility measuring submission system of clause 12, wherein the second graphical user interface further displays the document image data.

Clause 14: The legibility measuring submission system of clause 12, wherein the memory stores further instructions that are configured to cause the system to: receive, from the user device, second document image data of the document; process the second document image data to create second language data comprising a second plurality of words; count the second plurality of words in the second language data to obtain a second overall number; identify the common words from the second plurality of words; count the common words to obtain a second common word number; divide the second common word number by the second overall number to obtain a second score; and determine that the second score is above the predetermined legibility threshold.

Clause 15: The legibility measuring submission system of clause 12, wherein the first graphical user interface comprises an option for a user to override the prompt asking the user to rescan the document, and wherein the memory stores further instructions that are configured to cause the system to: submit the document to a third party.

Clause 16: The legibility measuring submission system of clause 12, wherein the first graphical user interface further indicates reasons the first score is below the predetermined legibility threshold.

Clause 17: The legibility measuring submission system of clause 12, wherein the second graphical user interface further indicates an alert specifying pages that are missing from the document.

Clause 18: A legibility measuring system comprising: one or more processors; memory in communication with the one or more processors and storing instructions that are configured to cause the system to: automatically receive page image data for each page of a plurality of pages of a document from a user device; process the page image data for each page to create language data comprising a plurality of words; count the plurality of words in the language data to obtain an overall number; identify common words from the plurality of words; count the common words to obtain a common word number; divide the common word number by the overall number to obtain a score; determine whether the score is below a predetermined legibility threshold; responsive to determining the score is below the predetermined legibility threshold for an individual page of the plurality of pages: generate a first graphical user interface indicating that the individual page is not legible and shows the page image data of the page; and transmit, to the user device, the first graphical user interface for display.

Clause 19: The legibility measuring system of clause 18, wherein the first graphical user interface recognizes one or more individual pages and indicates which of the plurality of pages are missing.

Clause 20: The legibility measuring system of clause 18, wherein the memory stores further instructions that are configured to cause the system to: generate a second graphical user interface indicating the system is processing the page; and transmit the second graphical user interface to the user device for display.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors;
memory in communication with the one or more processors and storing instructions that are configured to cause the system to:
receive document image data of a document;
process the document image data to create language data comprising a plurality of words;
count the plurality of words in the language data to obtain an overall number;
identify common words from the plurality of words;
count the common words to obtain a common word number;
divide the common word number by the overall number to obtain a score;
determine whether the score is below a predetermined legibility threshold; and
responsive to determining the score is below the predetermined legibility threshold, indicate that the document is not legible.

2. The system of claim 1, wherein the memory stores further instructions that are configured to cause the system to:
retrieve a list of common words from a database.

3. The system of claim 2, wherein identifying the common words from the plurality of words further comprises:
compare each word of the plurality of words in the language data to the list of common words.

4. The system of claim 2, wherein the memory stores further instructions that are configured to cause the system to:
receive document information regarding the document;
select certain document information; and
add the certain document information to the list of common words to create an augmented list.

5. The system of claim 4, wherein determining which words in the language data are the common words further comprises:
comparing each word in the language data to the augmented list.

6. The system of claim 4, wherein the predetermined legibility threshold is based on the certain document information.

7. The system of claim 4, wherein the certain document information is a first name, a last name, an identification number, an institution name, a merchant name or combinations thereof.

8. The system of claim 1, wherein counting the words in the language data further comprises counting words than have greater than a predetermined number of characters.

9. The system of claim 1, wherein the memory stores further instructions that are configured to cause the system to:
generate a first graphical user interface indicating the system is processing;
transmit the first graphical user interface to a user device for display;
responsive to determining the score is below the predetermined legibility threshold:
generate a second graphical user interface to indicate that the document is not legible; and
transmit, to the user device, the second graphical user interface for display;
responsive to determining the score is above the predetermined legibility threshold:
generate a third graphical user interface indicating that the document is legible for display; and
transmit, to the user device, the third graphical user interface.

10. The system of claim 9, wherein generating the second graphical user interface indicating that the document is not legible includes the document image data.

11. The system of claim 10, wherein the second graphical user interface that includes the document image data shows a particular part of the document image data that is not legible.

12. A system comprising:
one or more processors;
memory in communication with the one or more processors and storing instructions that are configured to cause the system to:
receive first image data of a document;
process the first image data to create first text data comprising a first plurality of words;
count the first plurality of words in the first text data to obtain a first overall number;
identify common words from the first plurality of words;
count the common words to obtain a first common word number;
divide the first common word number by the first overall number to obtain a first score;
determine whether the first score is above a threshold;
responsive to determining the first score is above the threshold, indicate the document is legible; and
responsive to determining the first score is below the threshold, indicate the document is not legible.

13. The system of claim 12, wherein the memory stores further instructions that are configured to cause the system to:
responsive to determining the first score is above the threshold:
generate a first graphical user interface to indicate that the document is legible;
transmit, to a user device, the first graphical user interface for display;
responsive to determining the first score is below the threshold:
generate a second graphical user interface displaying:
the first image data;
an indication that the document is not legible; and
a prompt asking to rescan the document; and
transmit, to the user device, the second graphical user interface for display.

14. The system of claim 13, wherein the memory stores further instructions that are configured to cause the system to:

receive, from the user device, second image data of the document;

process the second image data to create second text data comprising a second plurality of words;

count the second plurality of words in the second text data to obtain a second overall number;

identify the common words from the second plurality of words;

count the common words to obtain a second common word number;

divide the second common word number by the second overall number to obtain a second score; and determine that the second score is above the threshold.

15. The system of claim 13, wherein the first graphical user interface comprises an option for a user to override the prompt asking the user to rescan the document, and wherein the memory stores further instructions that are configured to cause the system to:

submit the document to a third party.

16. The system of claim 13, wherein the first graphical user interface further indicates reasons the first score is below the threshold.

17. The system of claim 13, wherein the second graphical user interface further indicates an alert specifying pages that are missing from the document.

18. A method comprising:

receiving, at one or more processors, page data for each page of a plurality of pages of a document;

processing, using the one or more processors, the page data for each page to create text data comprising a plurality of words;

counting the plurality of words in the text data to obtain an overall number;

identifying, using the one or more processors, common words from the plurality of words;

counting the common words to obtain a common word number;

dividing the common word number by the overall number to obtain a score;

determining, using the one or more processors, whether the score is below a predetermined legibility threshold; and responsive to determining the score is below the predetermined legibility threshold for an individual page of the plurality of pages, indicate that the individual page is not legible.

19. The method of claim 18, further comprising:

determining that the document corresponds to a first document type;

determining, based on the first document type, that one or more pages are missing from the plurality of pages;

generating a first graphical user interface to indicate that the individual page is not legible showing:

the page data of the individual page; and indicating that one or more pages of the plurality of pages are missing; and transmitting, to a user device, the first graphical user interface for display.

20. The method of claim 19, further comprising:

generating a second graphical user interface indicating the page is processing; and transmitting the second graphical user interface to the user device for display.

* * * * *